United States Patent
Fukuda et al.

(10) Patent No.: US 7,959,728 B2
(45) Date of Patent: Jun. 14, 2011

(54) MESOPOROUS SILICA PARTICLES AND PRODUCTION PROCESS THEREOF

(75) Inventors: Kentaro Fukuda, Shunan (JP); Kenji Fukunaga, Shunan (JP); Hiroya Yamashita, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 0 days.

(21) Appl. No.: 12/191,591

(22) Filed: Aug. 14, 2008

(65) Prior Publication Data
US 2009/0060816 A1 Mar. 5, 2009

Related U.S. Application Data

(62) Division of application No. 10/901,057, filed on Jul. 29, 2004, now abandoned.

(30) Foreign Application Priority Data

Jul. 29, 2003 (JP) ................ 2003-203206
Sep. 17, 2003 (JP) ................ 2003-324750

(51) Int. Cl.
 C04B 14/04 (2006.01)
 C01B 33/12 (2006.01)
 B01J 21/00 (2006.01)
(52) U.S. Cl. ........ 106/482; 423/335; 423/338; 423/339; 502/232; 502/233; 502/234
(58) Field of Classification Search .............. 106/482; 423/335, 338, 339; 502/232, 233, 234
See application file for complete search history.

(56) References Cited

U.S. PATENT DOCUMENTS

| | | | |
|---|---|---|---|
| 5,030,286 A * | 7/1991 | Crawford et al. | 106/435 |
| 5,951,962 A | 9/1999 | Muller et al. | |
| 7,018,596 B2 | 3/2006 | Satou et al. | |
| 2001/0043901 A1 * | 11/2001 | Pinnavaia et al. | 423/326 |
| 2005/0025690 A1 * | 2/2005 | Fukuda et al. | 423/335 |
| 2005/0047985 A1 * | 3/2005 | Mori et al. | 423/335 |

(Continued)

FOREIGN PATENT DOCUMENTS

CN 1341553 A 3/2002

(Continued)

OTHER PUBLICATIONS

Hongyou Fan et al.; Journal of Non-Crystalline Solids, vol. 285, No. 1-3, Jun. 2001, pp. 71-78.

(Continued)

*Primary Examiner* — Jerry Lorengo
*Assistant Examiner* — Jennifer A Smith
(74) *Attorney, Agent, or Firm* — Birch, Stewart, Kolasch & Birch, LLP

(57) ABSTRACT

A process for wet pulverizing mesoporous silica particles while a surfactant exists in mesopores, and mesoporous silica particles having an average particle diameter of 1 μm or less, wherein the volume of mesopores having a diameter of 2 to 50 nm is 0.7 mL/g or more and the geometric standard deviation of a mesopore distribution is 2.0 or less. Mesoporous silica particles having a particle diameter in a submicron order can be obtained at a high yield without causing the marked collapse of mesopores and can be produced efficiently by using an ordinary pulverizer and safely by using an aqueous medium. The mesoporous silica particles having an average particle diameter of 1 μm or less are useful as an ink absorbent for ink jet recording paper, low-dielectric film, catalyst support, separating agent, adsorbent and medical carrier for medicines.

10 Claims, 1 Drawing Sheet

U.S. PATENT DOCUMENTS

2009/0060816 A1 * 3/2009 Fukuda et al. ............... 423/339

FOREIGN PATENT DOCUMENTS

| CN | 1346790 A | 5/2002 |
| CN | 1511785 A | 7/2004 |
| JP | 2000-44227 A | 2/2000 |
| JP | 2002-356621 A | 12/2002 |

OTHER PUBLICATIONS

K.K. Unger et al.; Journal of Chromatography, vol. 892, No. 1-2, Sep. 15, 2000, pp. 47-55.

Michitaka Suzuki et al.; Kagaku Kogaku Ronbunshuu (Papers an Chemical Engineering), vol. 11, No. 4, pp. 438-442, 1985.

* cited by examiner

US 7,959,728 B2

MESOPOROUS SILICA PARTICLES AND PRODUCTION PROCESS THEREOF

This Nonprovisional application, which is a divisional of application Ser. No. 10/901,057 filed Jul. 29, 2004, now abandoned claims priority under 35 U.S.C. §119(a) on Japanese Patent Application No(s). 2003-203206 and 2003-324750 filed in Japan on Jul. 29, 2003 and Sep. 17, 2003, respectively, the entire contents of which are hereby incorporated by reference.

FIELD OF THE INVENTION

The present invention relates to mesoporous silica and a production process thereof. More specifically, it relates to mesoporous silica particles having a particle diameter in a submicron order and useful as a catalyst support, separating agent, adsorbent, low-dielectric film or ink absorbent for ink jet recording paper and to a process for producing the above particles efficiently at a high yield.

BACKGROUND OF THE INVENTION

Mesoporous silica is a new material having pores with a diameter of 2 to 50 nm (to be referred to as "mesopores" hereinafter) and expected to be used in various fields such as catalyst support and separating agents. Like other inorganic materials, it is preferably in the form of fine particles in most cases when it is actually used.

For example, when it is used as thin film like an ink absorbent for ink jet recording paper or low-dielectric thin film, to obtain a flat homogeneous film, mesoporous silica must be particulate and submicron-sized mesoporous silica particles are needed.

In the fields of catalyst support, separating agents, adsorbents and medical carriers for medicines, mesoporous silica is granulated, molded or dispersed uniformly in a matrix. To improve the mechanical strength of a granulated or molded product or dispersibility in the matrix, mesoporous silica must be particulate.

Under the above situation, mesoporous silica must be particulate. However when mesoporous silica is pulverized into fine particles, mesopores that are the greatest feature of mesoporous silica collapse, resulting in a greatly reduced value as a material.

Particularly when mesoporous silica is pulverized into submicron-sized fine particles, the collapse of mesopores is marked and the volume of mesopores in mesoporous silica greatly decreases.

In view of the above problems, the inventors of the present invention propose a process for obtaining particulate mesoporous silica by processing a mixed solution of mesoporous silica and a cationic resin dissolved in an aqueous solvent with a high-pressure homogenizer (JP-A 2002-356621) (the term "JP-A" as used herein means an "unexamined published Japanese patent application").

However, to make mesoporous silica fully particulate by the above process, the mixed solution must be processed with the high-pressure homogenizer many times in most cases, leaving room for the improvement of production efficiency. Since mesoporous silica produced by the above process contains the cationic resin for the prevention of the collapse of its mesoporous structure, its application is limited and there is a problem with uniformity in mesopore size due to a wide mesopore distribution. Therefore, it is difficult to use it as a catalyst support or separating agent which is used for a specific-sized substance.

As means of pulverizing mesoporous silica while the collapse of its mesoporous structure is prevented, wet pulverizing using an organic solvent as a dispersion medium is proposed (JP-A 2000-44227).

Although the above method provides a certain measure of effect, in order to prevent the collapse of mesopores, mesoporous silica can be pulverized into particles of a size only about 10 µm. When it is pulverized into submicron-sized fine particles, the volume of mesopores in mesoporous silica greatly decreases.

SUMMARY OF THE INVENTION

It is an object of the present invention to provide a process capable of obtaining mesoporous silica particles having a particle diameter in a submicron order at a high yield without causing the marked collapse of mesopores and of producing them efficiently by using an ordinary pulverizer.

It is another object of the present invention to provide mesoporous silica particles having a particle diameter in a submicron order, a satisfactory mesopore volume and uniformity in mesopore diameter.

It is still another object of the present invention to provide a dispersion and granulated product of the mesoporous silica particles of the present invention.

Other objects and advantages of the present invention will become apparent from the following description.

According to the present invention, firstly, the above objects and advantages of the present invention are attained by a process for producing pulverized mesoporous silica particles, comprising wet pulverizing mesoporous silica particles while a surfactant exists in mesopores.

According to the present invention, secondly, the above objects and advantages of the present invention are attained by mesoporous silica particles having an average particle diameter of 1 µm or less, wherein the volume of mesopores having a diameter of 2 to 50 nm is 0.7 mL/g or more, and the geometric standard deviation of a mesopore distribution is 2.0 or less.

According to the present invention, thirdly, the above objects and advantages of the present invention are attained by a dispersion containing the above mesoporous silica particles of the present invention and a granulated product obtained by granulating the above mesoporous silica particles of the present invention.

DETAILED DESCRIPTION OF THE INVENTION

Figure 1:
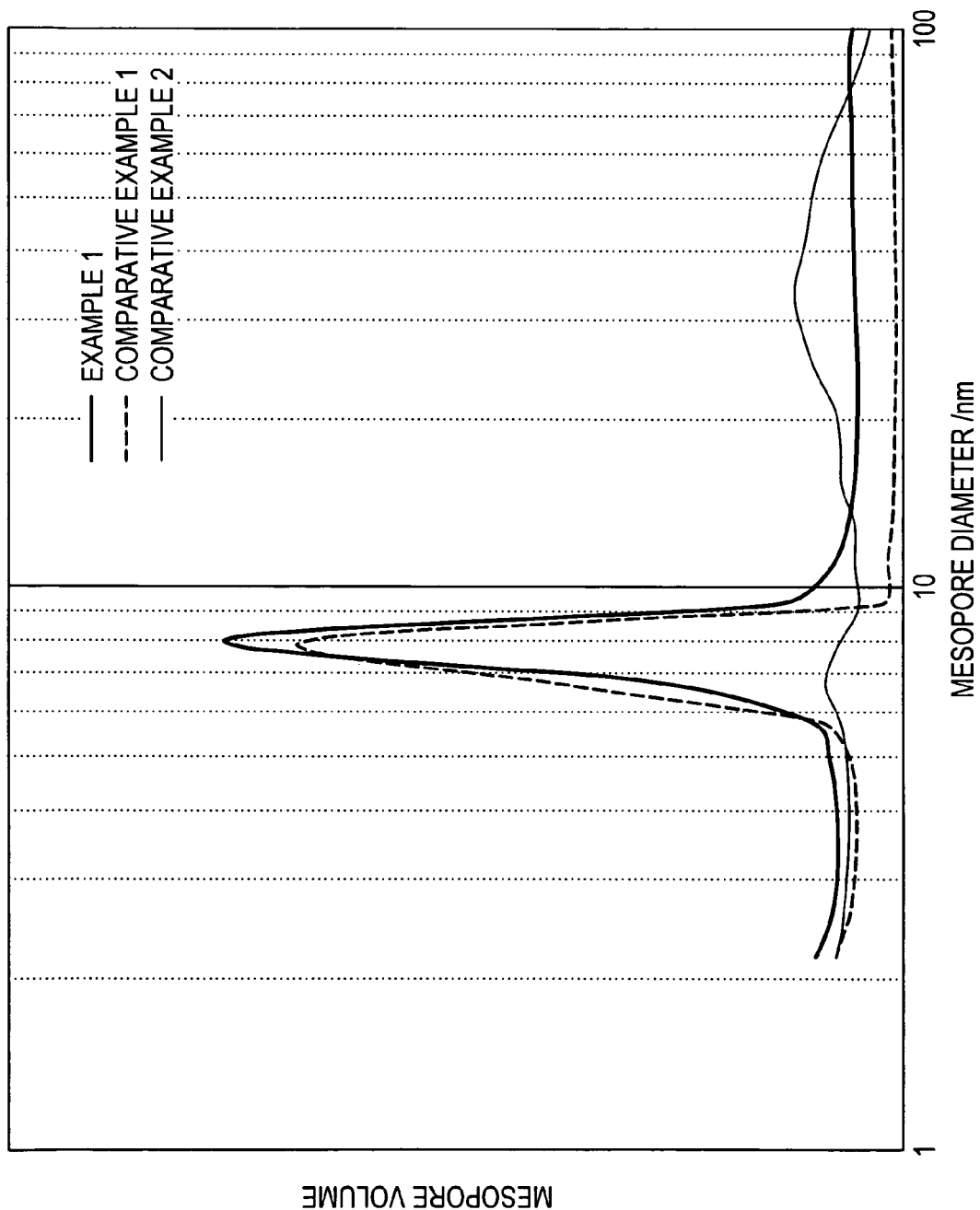
FIG. 1 is a graph showing the mesopore distribution curves of mesoporous silica particles obtained in Example 1, Comparative Example 1 and Comparative Example 2.

The mesoporous silica particles of the present invention are obtained by using an aggregate of a surfactant as template for mesopores when silica is formed.

The mesoporous structure of the mesoporous silica particles is not particularly limited and is, for example, a mesoporous structure that tubular mesopores are arranged in a honeycomb-like form or a 3-D net-like mesoporous structure that spherical mesopores are arranged regularly and communicate with one another, depending on the type of the surfactant and others.

The mesopore diameter of the mesoporous silica particles is not particularly limited and may be selected according to application purpose. The mesopore diameter of the mesoporous silica particles can be controlled according to the type of the surfactant and others.

As a typical method for preparation of the mesoporous silica particles, a method which comprises precipitating silica from a silica source in the presence of surfactant as a template, then removing the surfactant from the resulting mixture is mentioned.

A detailed description is subsequently given of a typical process for producing mesoporous silica particles by using an aggregate of the molecules of a surfactant.

The silica source and the surfactant are first mixed together in a polar solvent. To improve the structural regularity of the obtained mesoporous silica particles, an appropriate amount of an acid or alkali is preferably added.

Examples of the above polar solvent include water, organic solvents such as alcohols including methanol, ethanol and isopropanol, ethers and ketones, and mixed solvents thereof. Out of these, it is the most preferred to use water alone from the viewpoint of handling ease.

Examples of the above silica source include particulate silica such as fumed silica, precipitated silica and colloidal silica, alkali metal silicates and silicon alkoxides. Out of these, alkali metal silicates and active silica sols obtained by dealkalizing these alkali metal silicates are the most preferred because mesoporous silica can be obtained under mild reaction conditions and they are inexpensive.

The above surfactant is a compound which forms a micellar or lamellar aggregate and may be a cationic, anionic or nonionic surfactant or polymer having surface activity. A surfactant capable of forming a micelle is selected according to the above polar solvent.

Specific examples of the surfactant include alkyltrimethylammonium and polyoxyethylene alkyl ethers having a linear alkyl group having 8 to 20 carbon atoms, and block copolymer of ethylene glycol and propylene glycol.

Out of the above surfactants, polyoxyethylene alkyl ethers having a linear alkyl group having 8 to 20 carbon atoms and block copolymer of ethylene glycol and propylene glycol are preferred because they are inexpensive and have low toxicity and biodegradability.

The amount of the above surfactant is not particularly limited but preferably 50 to 200 parts by weight based on 100 parts by weight of the silica source in terms of $SiO_2$.

To expand the mesopore diameter of mesoporous silica, a hydrophobic compound such as 1,3,5-trimethylbenzene or 1,3,5-tributylbenzene may further be added.

Thereafter, the above silica source are reacted under specific reaction conditions to obtain mesoporous silica having a structure that a micellar or lamellar aggregate of the surfactant is imprinted. The reaction conditions are not particularly limited and reaction conditions suitable for a reaction system can be selected.

Stated specifically, when particulate silica is used as the above silica source, it is preferably reacted in an alkaline reaction solution at 100 to 150° C. under pressure. When an alkali metal silicate or silicon alkoxide is used as the silica source, it is preferably reacted in an alkaline or acid solution at 20 to 100° C. under atmospheric pressure.

The greatest feature of the process of the present invention is that mesoporous silica particles produced by the above process are wet pulverized while the surfactant is existent in mesopores.

In all the processes for producing particulate mesoporous silica of the prior art, mesoporous silica particles obtained by the above production process are pulverized after the surfactant is substantially removed from the particles. According to the processes, when the mesoporous silica particles are pulverized into submicron-sized fine particles, mesopores collapse and the characteristic properties of mesoporous silica greatly deteriorate unless a special pulverizing technique is used.

In contrast to this, according to the process of the present invention in which mesoporous silica particles are wet pulverized while a surfactant exists in mesopores, even when mesoporous silica particles are pulverized into submicron-sized fine particles with an ordinary pulverizer, mesopores rarely collapse and the specific surface area and the volume of mesopores can be maintained.

The process in which wet pulverizing is carried out while a surfactant exists in mesopores was first proposed by the present invention and provides an extremely marked effect that mesoporous silica particles can be finely pulverized while mesopores are protected at a high ratio.

The reason why the collapse of mesopores in mesoporous silica particles can be suppressed by wet pulverizing the mesoporous silica particles in the presence of the surfactant is unknown but the inventors of the present invention assume as follows.

That is, it is assumed that when mesoporous silica particles are wet pulverized in a dispersion medium, partial hydrolysis of silica is caused by mechanical stress and then silica re-precipitates.

When the surfactant does not exist at this point, regular mesopores disappear through repetitions of hydrolysis and precipitation and mesoporous silica changes into ordinary silica.

Characteristic mesopores are formed in the mesoporous silica particles by the function of the surfactant when the silica source precipitates as silica. Therefore, it is presumed that when the surfactant exists during the above wet pulverizing, even if hydrolysis and precipitation are repeated many times, the characteristic mesopores are retained by the function of the surfactant.

In the present invention, to make the surfactant exist in mesopores, surfactant can be added to the mesoporous silica particles produced by the process of the prior art. However, to obtain the effect of the present invention with the most certainty, in the above process for producing mesoporous silica particles, it is preferred that the surfactant used as a template for the mesopores of the mesoporous silica particles should remain in the mesopores and not be removed from the mesopores.

In the present invention, the amount of the surfactant which exists during wet pulverizing is preferably 20 to 300 parts by weight, particularly preferably 50 to 200 parts by weight based on 100 parts by weight of the mesoporous silica particles. When the amount of the surfactant is 20 parts or more by weight, the collapse of mesopores can be effectively suppressed. When the amount is 300 parts or less by weight, cost required for the surfactant can be reduced and the surfactant can be easily removed after pulverizing.

Examples of the dispersion medium used for wet pulverizing in the present invention include water, organic solvents such as alcohols including methanol, ethanol and isopropanol, ethers and ketones, and mixed solvents thereof. Out of these, it is the most preferred to use water alone from the viewpoint of handling ease.

In a more preferred embodiment of the present invention, the pH of the solution to be processed by wet pulverizing while the surfactant exists in mesopores is adjusted to a range of pH at which mesoporous silica particles formed from silica source ±2.

The collapse of mesopores by wet pulverizing can be particularly effectively suppressed by controlling the pH. Even when the mesoporous silica particles are wet pulverized into submicron-sized particles, the retainability of mesopores (volume of mesopores after wet pulverizing/volume of mesopores before wet pulverizing) can be adjusted to 90% or more.

In the most preferred embodiment of the present invention, the surfactant and the silica source are reacted with each other in an aqueous solvent to obtain mesoporous silica particles containing the surfactant, and then the mesoporous silica particles are wet pulverized by using part or all of the reaction solution as a dispersion medium.

When the reaction solution is used as a dispersion medium, the amount of the surfactant and pH at the time of wet pulverizing can be adjusted without taking special means and a series of production steps can be greatly simplified.

That is, according to the present invention, there is provided a process for producing pulverized mesoporous silica particles, comprising a reaction step for forming mesoporous silica particles in a polar solvent by precipitating silica in the presence of a surfactant, a pulverizing step for wet pulverizing the mesoporous silica particles contained in a reaction solution obtained in the above reaction step as the solution to be processed, and a removing step for removing at least part of the surfactant existent in the mesopores of the mesoporous silica particles.

In the present invention, to enhance the structural regularity of mesoporous silica, aging at normal temperature or under heating may be carried out after wet pulverizing.

In the present invention, the above wet pulverizing method is not particularly limited and any known method may be employed. For example, wet pulverizing with a wet medium type dispersion device such as a bead mill or pot mill, ultrasonic dispersion device, high-pressure homogenizer or a medium-free dispersion device, such as a colloid mill in which particles are pulverized by passing through the gap (several μm to several tens of μm) between a fixed disk and a rotary disk is employed. Out of these, a wet medium type dispersion device is preferred because it has high pulverizing efficiency and can easily pulverize mesoporous silica into submicron-sized fine particles.

The content of the mesoporous silica particles in the solution to be processed by wet pulverizing is preferably 1 to 40 wt %, more preferably 3 to 20 wt %. When the content of mesoporous silica particles is 1 wt % or more, wet pulverizing efficiency can be improved and when the content is 40 wt % or less, the mesoporous silica particles can be uniformly and easily pulverized into fine particles.

Since wet pulverizing is carried out in the presence of the surfactant in the present invention, the solution to be processed may foam and the pulverizing efficiency may lower. In this case, it is preferred to take a measure for preventing the inclusion of foam into the solution, for example, the elimination of a dead volume in a vessel for pulverizing. The addition of a small amount of an anti-foaming agent is also effective. Preferred examples of the anti-foaming agent include acetylene glycol-based anti-foaming agents and silicone-based anti-foaming agents.

The pulverized mesoporous silica particles can be obtained by removing at least part of the surfactant from the pulverized mesoporous silica particles containing the surfactant obtained by the above wet pulverizing.

The method of removing the surfactant is not particularly limited, for example, extraction with a suitable solvent, extraction with a supercritical fluid such as carbon dioxide, or calcinations at 400 to 600° C. are mentioned.

For the removal of the above surfactant, the surfactant is preferably removed completely but the surfactant residue may be contained in limits that do not impair the characteristic properties of the mesopores of the mesoporous silica particles.

In the present invention, the method of extracting the surfactant using an extraction solvent is preferred because the extracted surfactant can be recycled and the re-agglomeration of mesoporous silica particles after wet pulverizing can be easily suppressed.

In order to extract the surfactant using an extraction solvent, preferably, the pulverized mesoporous silica particles containing the surfactant are dispersed into the extraction solvent, stirred at normal temperature or under heating for a specific period of time and subjected to solid-liquid separation.

Any extraction solvent may be used if it can extract the surfactant from the pulverized mesoporous silica particles. Examples of the extraction solvent include alcohols such as methanol, ethanol and propanol and ketones such as acetone, from which a suitable solvent may be selected.

The above solid-liquid separation is not particularly limited but it is preferably carried out by filtration with a filter press, centrifugation with a centrifugal separator or a decanter, or ultrafiltration.

In the present invention, impurities other than the surfactant such as an acid, alkali and salt may be contained in the processed solution after wet pulverizing. These impurities may be removed simultaneously with the removal of the surfactant. When it is difficult to remove them simultaneously with the removal of the surfactant, it may be removed by washing separately.

Out of the pulverized mesoporous silica particles having a particle diameter in a submicron order obtained by the above production process, mesoporous silica particles having an average particle diameter of 1 μm or less, a volume of mesopores having a diameter of 2 to 50 nm of 0.7 mL/g or more and a geometric standard deviation of a mesopore distribution of 2.0 or less can be particularly advantageously used in the fields of catalyst supports, separating agents, adsorbents, low-dielectric films and ink absorbents for ink jet recording paper.

The mesoporous silica particles provided by the present invention have an average particle diameter of 1 μm or less. The mesoporous silica particles having the above average particle diameter can form a flat homogeneous film in fields in which a film formed from mesoporous silica particles is used. Since a granulated or molded product obtained from the mesoporous silica particles has high mechanical strength, it is also useful in the fields of catalyst supports, separating agents and adsorbents.

Out of the mesoporous silica particles having the above average particle diameter, mesoporous silica particles having an average particle diameter of 0.5 μm or less are preferred, and mesoporous silica particles having an average particle diameter of 0.3 μm or less are particularly preferred. The lower limit of the average particle diameter is not particularly limited but generally 0.01 μm, preferably 0.03 μm.

The mesoporous silica particles of the present invention are characterized in that the volume of mesopores is 0.7 mL/g or more though they are fine particulate as described above. When a film is formed from mesoporous silica particles having the above volume of mesopores, the porosity of the obtained film grows, thereby making it possible to increase the amount of ink absorbed into ink jet recording paper and to reduce the dielectric constant of a low-dielectric film. Mesoporous silica particles having the above volume of mesopores are excellent in improving the catalytic activity, the separation efficiency, the adsorption capacity and the holding amount of a medicine.

Out of the mesoporous silica particles having the above volume of mesopores, mesoporous silica particles having a mesopore volume of 1.0 mL/g or more are particularly preferred. The upper limit of mesopore volume is not particularly limited but generally 3 mL/g.

The mesoporous silica particles of the present invention are also characterized in that the geometric standard deviation of a mesopore distribution (to be referred to as "$\sigma_p$" hereinafter) is 2.0 or less.

$\sigma_p$ is an index of uniformity in mesopore diameter. As $\sigma_p$ becomes smaller, the mesopores become more uniform in diameter.

Since mesoporous silica particles having the above $\sigma_p$ are extremely uniform in mesopore diameter, a substance having a specific size can be selectively treated in the fields of catalyst supports, separating agents and adsorbents.

Out of the mesoporous silica particles having the above $\sigma_p$, mesoporous silica particles having a geometric standard deviation of 1.7 or less are particularly preferred. The lower limit of $\sigma_p$ of the mesoporous silica particles is not particularly limited but generally 1.

The mesoporous silica particles of the present invention are preferably amorphous silica particles. That is, crystalline silica often forms a crystalline silica dust in process of making and use, and the crystalline silica dust causes silicosis which is difficult to be cured. Therefore, special attention must be paid to the crystalline silica. In contrast to this, as amorphous silica does not form a crystalline silica dust, it is extremely advantageous in terms of safety.

The mesoporous silica particles of the present invention have a geometric standard deviation of a particle size distribution (to be referred to as "$\sigma_d$" hereinafter) of preferably 1 to 3, particularly preferably 1.5 to 2.5.

$\sigma_d$ is an index of uniformity in particle diameter. As $\sigma_d$ becomes smaller, the fine particles become more uniform in particle diameter.

Mesoporous silica particles having a $\sigma_d$ of 1 or more have a high packing density when they are granulated or molded. This is because the porosity of a packed layer decreases as the particle size distribution becomes wider as described in Kagaku Kogaku Ronbunshuu (Papers on Chemical Engineering), vol. 11, No. 4, pp. 438, 1985. Therefore, when the mesoporous silica particles having $\sigma_d$ of 1 or more are granulated or molded, they tend to become dense, whereby a granulated or molded product having high mechanical strength can be formed with a small amount of a binder. When the mesoporous silica particles are filled into a container and used, the container can be made compact. Since mesoporous silica particles having a $\sigma_d$ of more than 3 include coarse particles and extremely fine particles, they may cause a handling problem.

The mesoporous silica particles of the present invention preferably have an average mesopore diameter of 5 nm or more. That is, the mesoporous silica particles having an average mesopore diameter of 5 nm or more are useful for not only the above application purposes but also other application purposes because they can adsorb, separate or carry a polymer substance such as protein.

The mesoporous silica particles of the present invention preferably have an X-ray diffraction peak corresponding to a d value of 2 to 50 nm. Since the mesoporous silica particles having the above diffraction peak have mesopores uniform in diameter and arranged regularly, they can be used as a functional material for an optical device, electronic device or others. They can also display more stable performance in other application fields.

Although the process for producing the mesoporous silica particles of the present invention is not particularly limited, they can be advantageously produced by the following process.

First, an alkali metal silicate, surfactant and acid are mixed together to precipitate silica, mesoporous silica particles are obtained by using a micellar or lamellar aggregate of the molecules of the surfactant as a template, the mesoporous silica particles are wet pulverized, and the surfactant is extracted and removed from the pulverized mesoporous silica particles.

The amount of the above surfactant is preferably 100 parts or more by weight based on 100 parts by weight of silica. When the amount of the surfactant is 100 parts or more by weight, the volume of mesopores can be increased. Mesoporous silica particles having a small $\sigma_p$ and a uniform mesopore diameter can be obtained.

The above surfactant is preferably a block copolymer of ethylene glycol and propylene glycol. By using this block copolymer, mesoporous silica particles having a small $\sigma_p$ and an average mesopore diameter of 5 nm or more can be obtained. When a surfactant other than the above block copolymer is used and mesoporous silica particles are wet pulverized, $\sigma_p$ tends to become large and it is difficult to obtain mesoporous silica particles having an average mesopore diameter of 5 nm or more.

To precipitate silica, the reaction mixture is preferably maintained at 20 to 40° C. for 0.5 to 10 hours and then at 80 to 100° C. for 5 to 20 hours. According to this process, the mesopores become uniform in diameter and are arranged regularly, thereby making it possible to obtain mesoporous silica particles having an X-ray diffraction peak.

The above wet pulverizing is preferably carried out without removing the surfactant used as a template for the mesopores of the mesoporous silica particles. According to this process, mesoporous silica particles can be easily pulverized into fine particles without impairing pore volume and uniformity in the diameter of the mesopores of the mesoporous silica particles. The above wet pulverizing is the most preferably carried out by using part or all of the reaction solution as a dispersion medium.

The pulverizer used for the above wet pulverizing is preferably a wet medium type pulverizer such as boad mill or pot mill. The wet medium type pulverizer has high pulverizing efficiency and can pulverize mesoporous silica particles into fine particles having a particle diameter of 1 μm or less efficiently.

When a wet medium type pulverizer is used, the average particle diameter and $\sigma_d$ of the obtained pulverized mesoporous silica particles can be controlled by suitably selecting the particle diameter of beads as a medium and the processing time (residence time in the pulverizing unit of a continuous pulverizer).

That is, when the particle diameter of beads is small, the average particle diameter tends to become small and when the processing time is long, $\sigma_d$ tends to become small. Therefore, when small beads are used for processing for a long time, for example, mesoporous silica particles having a small average particle diameter and a small $\sigma_d$ are obtained and when large beads are used for processing for a short time, mesoporous silica particles having a large average particle diameter and a large $\sigma_d$ are obtained.

To remove the surfactant from the mesoporous silica particles by extraction, preferably, the mesoporous silica particles containing the surfactant are dispersed in an extraction solvent and stirred under heating for a specific period of time, followed by solid-liquid separation. The extraction solvent is preferably an alcohol such as methanol, ethanol or propanol, and the solid-liquid separation is preferably carried out by centrifugation, ultrafiltration or precision filtration.

The mesoporous silica dispersion of the present invention is obtained by dispersing the mesoporous silica particles of the present invention into a dispersion medium. The mesoporous silica dispersion can form a flat homogeneous film and is useful as a coating solution for forming a thin film such as the ink absorbing layer of ink jet recording paper or a low-dielectric film.

In the present invention, any dispersion medium of the mesoporous silica dispersion may be used without restriction if it can disperse the mesoporous silica particles. Examples of the dispersion medium include water, organic solvents such as alcohols including methanol, ethanol and isopropanol, ethers and ketones, and mixed solvents thereof. Out of these, it is the most preferred to use water alone from the viewpoint of handling ease.

The content of the mesoporous silica particles in the mesoporous silica dispersion is not particularly limited but preferably 5 to 50 wt %, particularly preferably 10 to 40 wt %.

That is, when the content of the mesoporous silica particles in the mesoporous silica dispersion is higher than 50 wt %, the fluidity of the dispersion is apt to be lower and when the content is lower than 5 wt %, it is difficult to obtain a film having a desired thickness and energy cost required for drying after application is apt to become high.

A dispersant may be added to the mesoporous silica dispersion of the present invention in order to enhance the dispersion stability of the mesoporous silica particles.

Preferred examples of the dispersant include cationic, anionic and nonionic resins and surfactants. Out of these, cationic resins having a primary, secondary or tertiary amine or quaternary ammonium salt are particularly preferred.

Particularly when it is used in ink jet recording paper, the fixability of an anionic dye contained in ink for ink jet printing can be improved by the function of the cationic resin and ink jet recording paper which is excellent in water resistance and printing density can be obtained.

The mesoporous silica granulated product of the present invention can be obtained by granulating the mesoporous silica particles of the present invention.

Mesoporous silica particles having a large particle diameter of the prior art have pores all of which are mesopores and it is difficult for a certain substance to diffuse into a mesopore and reach the inside of a particle. Therefore, the inside of each particle cannot be effectively used.

In contrast to this, as the mesoporous silica granulated product of the present invention has macropores between fine particles, a substance diffuses into the macropores and easily reaches the inside of each particle. Therefore, the inside of the mesoporous silica granulated product can be effectively used, whereby it is useful as a catalyst support, separating agent, adsorbent or medical carrier for medicines.

Further, the mesoporous silica particles can be granulated to a size of several μm to several tens of mm according to application purpose. Compared with a case where the mesoporous silica particles are used as they are, the mesoporous silica granulated product is extremely advantageous in handling ease when it is separated or collected.

The method of obtaining the above mesoporous silica granulated product is not particularly limited and any known method can be employed without restriction. Specifically, spray granulation for granulating a dispersion of mesoporous silica particles by spraying and drying, rolling granulation for powdery mesoporous silica particles, fluidized bed granulation, stirring granulation, compression granulation or extrusion granulation may be employed.

To further enhance the mechanical strength of the mesoporous silica granulated product, a binder may be added during granulation. Preferred examples of the binder include gelatin, polyvinyl pyrrolidone, polyvinyl alcohol, cellulose and derivatives thereof.

EXAMPLES

The following examples are provided for the purpose of further illustrating the present invention but are in no way to be taken as limiting.

The physical properties of the mesoporous silica particles were measured by the following methods.

(1) Measurement of Specific Surface Area of Mesoporous Silica Particles, and Volume, Average Diameter and $\sigma_p$ of Mesopores A nitrogen adsorption isotherm at 75K of fully dried mesoporous silica particles was taken by using a high-speed specific surface area/pore distribution measuring instrument (ASAP2010 of Micromeritics Co., Ltd.), and from the isotherm, specific surface area and mesopore distribution was calculated by BET method and BJH method respectively. The mesopore diameter axis of the mesopore distribution curve was a logarithmic scale.

The volume, retainability, average diameter ($av_p$) and $\sigma_p$ of mesopores having a diameter of 2 to 50 nm were calculated from the above mesopore distribution curve. For the calculation of the retainability, $av_p$ and $\sigma_p$ of the mesopores, the following equations (1), (2) and (3) were used, respectively.

Retainability of mesopores=volume of mesopores after pulverizing/volume of mesopores before pulverizing (1)

$$\log av_p = \Sigma\{v_i \log p_i\}/\Sigma v_i \quad (2)$$

$$\log \sigma_p = [\Sigma\{v_i(\log p_i - \log av_p)^2\}/\Sigma v_i]^{0.5} \quad (3)$$

In the above equations (2) and (3), "i" denotes an i-th section when the mesopore diameter axis is divided into an N number of sections, with the proviso that 1 to N are natural numbers. $v_i$ denotes the volume of mesopores having a diameter in the i-th section and $p_i$ is a geometric mean between the lower limit and the upper limit of mesopore diameter in the i-th section.

(2) Measurement of Average Particle Diameter and $\sigma_d$ of Mesoporous Silica Particles Mesoporous silica particles were dispersed in ion exchange water to a concentration of 3 wt % and processed with an ultrasonic dispersion device (UT-205 of Sharp Co., Ltd.) at 200 W for 5 minutes to prepare a sample. The volume-based particle size distribution of the sample was measured with a laser diffraction particle size analyzer (Coulter LS-230 of Coulter Co., Ltd.) at a dispersion medium (water) refractive index as 1.332 and a silica refractive index as 1.458. The particle diameter axis of the particle size distribution curve was a logarithmic scale.

The average particle diameter ($av_d$) and $\sigma_d$ were calculated from the above particle size distribution curve. For the calculation of $av_d$ and $\sigma_d$, the following equations (4) and (5) were used, respectively.

$$\log av_d = \Sigma\{v_i \log d_i\}/\Sigma v_i \quad (4)$$

$$\log \sigma_d = [\Sigma\{v_i(\log d_i - \log av_d)^2\}/\Sigma v_i]^{0.5} \quad (5)$$

In the above equations (4) and (5), "i" denotes an i-th section when the mesopore diameter axis is divided into an N number of sections, with the proviso that 1 to N are natural numbers. $v_i$ denotes the volume of particles having a diameter in the i-th section and $d_i$ is a geometric mean between the lower limit and the upper limit of particle diameter in the i-th section.

(3) Evaluation of Mesoporous Structure of Mesoporous Silica Particles

Mesoporous silica particles were dispersed in ion exchange water to a concentration of 0.1 wt % and processed with an ultrasonic dispersion device for 5 minutes to prepare a sample. The sample was dropped to a grid and dried at room temperature under reduced pressure. The mesoporous silica particles on the grid were observed through a transmission electron microscope to evaluate the mesoporous structure of the particles.

(4) Determination, of the Amount of Surfactant Existent in the Mesopores of Mesoporous Silica Particles Fully dried mesoporous silica particles were calcined at 500° C. for 6 hours to measure a weight change before and after calcination to obtain the amount of a surfactant existent in the mesopores of the mesoporous silica particles.

(5) X-Ray Diffraction Measurement of Mesoporous Silica particles

Mesoporous silica particles powders were filled into a measurement holder and measured at a CuKα-ray with an X-ray diffraction device (RINT-1400 of Rigaku Denki Co., Ltd.).

Example 1

A block copolymer of ethylene glycol and propylene glycol (Pluronic-P123 of BASF Co., Ltd.) was dissolved in ion exchange water to prepare a 20 wt % surfactant solution. 150 g of the surfactant solution, 44 g of 25 wt % sulfuric acid and 73 g of ion exchange water were mixed together to prepare a transparent solution. 133 g of sodium silicate (containing 15 wt % of $SiO_2$ and 5.1 wt % of $Na_2O$) was added dropwise to this solution under stirring to obtain a cloudy reaction mixture. The pH of the reaction mixture was 2.7.

The reaction mixture was maintained at 30° C. for 1 hour under stirring, heated at 95° C. and maintained at that temperature for 12 hours to produce mesoporous silica particles having the surfactant existent in mesopores.

Thereafter, a polyethylene pot was filled with 390 g of the above reaction mixture and 1,520 g of zirconia balls having a diameter of 2 mm and sealed up without a dead volume in the pot to wet pulverize the mixture with a pot mill. The amount of the surfactant existent in the mesopores was 150 parts by weight based on 100 parts by weight of silica, the pH of the solution to be processed was 2.8, and the content of the mesoporous silica particles in the solution was 5 wt %.

After particles were collected by centrifuging the wet pulverized reaction mixture, dispersing particles in ion exchange water and re-centrifugation were repeated to remove sulfuric acid and sodium sulfate.

Then, the mesoporous silica particles were dispersed in ethanol to a concentration of 1 wt %, stirred under heating and centrifuged to collect particles. Stirring in ethanol and the collection of particles by centrifugation were repeated to remove the surfactant, and the particles were dried to obtain mesoporous silica particles of the present invention.

Since three diffraction peaks corresponding to d values of 9.2, 5.8 and 5.2 were seen by the X-ray diffraction measurement of the obtained mesoporous silica particles, it was confirmed that the mesoporous silica particles had a regular mesoporous structure. Since only a broad halo was seen and no peak derived from crystalline silica was seen on a high angle region, it was confirmed that the mesoporous silica particles were amorphous.

As a sharp peak was seen at a mesopore diameter of about 8 nm in the mesopore distribution curve of the mesoporous silica particles, it was verified that the mesoporous silica particles had uniform mesopores.

The physical properties of the mesoporous silica particles are shown in Table 1 and the mesopore distribution curve is shown in FIG. 1.

Comparative Examples 1 and 2

A block copolymer of ethylene glycol and propylene glycol (Pluronic-P123 of BASF Co., Ltd.) was dissolved in ion exchange water to prepare a 20 wt % surfactant solution. 150 g of the surfactant solution, 44 g of 25 wt % sulfuric acid and 73 g of ion exchange water were mixed together to prepare a transparent solution. 133 g of sodium silicate (containing 15 wt % of $SiO_2$ and 5.1 wt % of $Na_2O$) was added dropwise to this solution under stirring to obtain a cloudy reaction mixture. The pH of the reaction mixture was 2.7.

The reaction mixture was maintained at 30° C. for 1 hour under stirring, heated at 95° C. and maintained at that temperature for 12 hours to produce mesoporous silica particles having the surfactant existent in mesopores.

After particles were collected by centrifuging the reaction mixture, dispersing particles in ion exchange water and re-centrifugation were repeated to remove sulfuric acid and sodium sulfate from the reaction mixture.

Then, the mesoporous silica particles were dispersed in ethanol to a concentration of 1 wt %, stirred under heating and centrifuged to collect particles. Stirring in ethanol and the collection of particles by centrifugation were repeated to remove the surfactant so as to obtain mesoporous silica particles as Comparative Example 1.

Since three diffraction peaks corresponding to d values of 9.2, 5.8 and 5.2 were seen by the X-ray diffraction measurement of the obtained mesoporous silica particles of Comparative Example 1, it was confirmed that the mesoporous silica particles had a regular mesoporous structure.

As a sharp peak was seen at a mesopore diameter of about 8 nm in the mesopore distribution curve of the mesoporous silica particles, it was confirmed that the mesoporous silica particles had uniform mesopores.

Then, the mesoporous silica particles were dispersed in ion exchange water to prepare a dispersion containing 5 wt % of mesoporous silica particles. A polyethylene pot was filled with 390 g of the above dispersion and 1,520 g of zirconia balls having a diameter of 2 mm and sealed up without a dead volume in the pot to wet pulverize the dispersion with a pot mill. The amount of the surfactant existent in the mesopores was 8 parts by weight based on 100 parts by weight of silica, and the pH of the processed solution was 5.6.

A precipitate was collected from the processed solution by centrifugation after wet pulverizing to obtain mesoporous silica particles as Comparative Example 2.

Since no distinct peak was seen by the X-ray diffraction measurement of the obtained mesoporous silica particles of Comparative Example 2, it was confirmed that the regular mesoporous structure collapsed.

As no distinct peak was seen in the mesopore distribution curve of the mesoporous silica particles, it was verified that the mesopores were lost.

The physical properties of the mesoporous silica particles of Comparative Examples 1 and 2 are shown in Table 1 and the mesopore distribution curves are shown in FIG. 1.

Example 2

A block copolymer of ethylene glycol and propylene glycol (Pluronic-F127 of BASF Co., Ltd.) was dissolved in ion exchange water to prepare a 10 wt % surfactant solution. 210 g of the surfactant solution, 59 g of 25 wt % sulfuric acid and 291 g of ion exchange water were mixed together to prepare a transparent solution. 140 g of sodium silicate (containing 15 wt % of $SiO_2$ and 5.1 wt % of $Na_2O$) was added dropwise to this solution under stirring to obtain a cloudy reaction mixture. The pH of the reaction mixture was 1.0.

The reaction mixture was maintained at 30° C. for 10 hours under stirring, heated at 80° C. and maintained at that temperature for 12 hours to produce mesoporous silica particles having the surfactant existent in mesopores.

Thereafter, part of the solution was removed from the above reaction mixture by decantation, and the content of the mesoporous silica particles in the reaction mixture was adjusted to 5 wt %.

A polyethylene pot was filled with 390 g of the above reaction mixture containing 5 wt % of the mesoporous silica particles and 1,520 g of zirconia balls having a diameter of 2 mm and sealed up without a dead volume in the pot to wet pulverize the mixture with a pot mill. The amount of the surfactant existent in the mesopores was 100 parts by weight based on 100 parts by weight of silica, and the pH of the processed solution was 1.1.

After particles were collected by centrifuging the processed solution, dispersing particles in ion exchange water and re-centrifugation were repeated to remove sulfuric acid and sodium sulfate from the processed solution.

Then, the mesoporous silica particles were dispersed in ethanol to a concentration of 1 wt %, stirred under heating and centrifuged to collect particles. Stirring in ethanol and the collection of particles by centrifugation were repeated to remove the surfactant, and the particles were dried to obtain mesoporous silica particles of the present invention.

Since three diffraction peaks corresponding to d values of 12.2, 8.6 and 7.0 were seen by the X-ray diffraction measurement of the obtained mesoporous silica particles, it was confirmed that the mesoporous silica particles had a regular mesoporous structure. Since only a broad halo was seen and no peak derived from crystalline silica was seen on a large angle side, it was confirmed that the mesoporous silica particles were amorphous.

As a sharp peak was seen at a mesopore diameter of about 9 nm in the mesopore distribution curve of the mesoporous silica particles, it was verified that the mesoporous silica particles had uniform mesopores.

The physical properties of the obtained mesoporous silica particles are shown in Table 1.

Comparative Examples 3 and 4

A block copolymer of ethylene glycol and propylene glycol (Pluronic-F127 of BASF Co., Ltd.) was dissolved in ion exchange water to prepare a 10 wt % surfactant solution. 210 g of the surfactant solution, 59 g of 25 wt % sulfuric acid and 291 g of ion exchange water were mixed together to prepare a transparent solution. 140 g of sodium silicate (containing 15 wt % of $SiO_2$ and 5.1 wt % of $Na_2O$) was added dropwise to this solution under stirring to obtain a cloudy reaction mixture. The pH of the reaction mixture was 1.0.

The reaction mixture was maintained at 30° C. for 10 hours under stirring, heated at 80° C. and maintained at that temperature for 12 hours to produce mesoporous silica particles having the surfactant existent in mesopores.

After a precipitate was obtained by centrifuging the reaction mixture, dispersing particles in ion exchange water and re-centrifugation were repeated to remove sulfuric acid and sodium sulfate from the reaction mixture.

Then, the mesoporous silica particles were dispersed in ethanol to a concentration of 1 wt %, stirred under heating and centrifuged to collect particles. Stirring in ethanol and the collection of particles by centrifugation were repeated to remove the surfactant so as to obtain mesoporous silica particles as Comparative Example 3.

Since three diffraction peaks corresponding to d values of 12.2, 8.6 and 7.0 were seen by the X-ray diffraction measurement of the obtained mesoporous silica particles of Comparative Example 3, it was confirmed that the mesoporous silica particles had a regular mesoporous structure.

As a sharp peak was seen at a mesopore diameter of about 9 nm in the mesopore distribution curve of the mesoporous silica particles, it was verified that the mesoporous silica particles had uniform mesopores.

Then, the mesoporous silica particles were dispersed in ion exchange water to prepare a dispersion containing 5 wt % of the mesoporous silica particles. A polyethylene pot was filled with 390 g of the above dispersion and 1,520 g of zirconia balls having a diameter of 2 mm and sealed up without a dead volume in the pot to wet pulverize the dispersion with a pot mill. The amount of the surfactant existent in the mesopores was 7 parts by weight based on 100 parts by weight of silica, and the pH of the processed solution was 5.6.

A precipitate was collected from the processed solution by centrifugation after wet pulverizing to obtain mesoporous silica particles as Comparative Example 4.

Since no distinct peak was seen by the X-ray diffraction measurement of the obtained mesoporous silica particles of Comparative Example 4, it was confirmed that the regular mesoporous structure collapsed.

As no distinct peak was seen in the mesopore distribution curve of the mesoporous silica particles, it was verified that mesopores were lost.

The physical properties of the mesoporous silica particles of Comparative Examples 3 and 4 are shown in Table 1.

Example 3

A block copolymer of ethylene glycol and propylene glycol (Pluronic-P123 of BASF Co., Ltd.) was dissolved in ion exchange water to prepare a 20 wt % surfactant solution. 100 g of the surfactant solution, 44 g of 25 wt % sulfuric acid and 123 g of ion exchange water were mixed together to prepare a transparent solution. 133 g of sodium silicate (containing 15 wt % of $SiO_2$ and 5.1 wt % of $Na_2O$) was added dropwise to this solution under stirring to obtain a cloudy reaction mixture. The pH of the reaction mixture was 2.7.

The reaction mixture was maintained at 30° C. for 10 hours under stirring to produce mesoporous silica particles having the surfactant existent in mesopores.

Thereafter, a polyethylene pot was filled with 390 g of the above reaction mixture and 1,520 g of zirconia balls having a diameter of 2 mm and sealed up without a dead volume in the pot to wet pulverize the mixture with a pot mill. The amount of the surfactant existent in the mesopores was 100 parts by weight based on 100 parts by weight of silica, the pH of the processed solution was 2.8, and the content of the mesoporous silica particles in the processed solution was 5 wt %.

The above processed solution after wet pulverizing was maintained at 80° C. for 12 hours to age the mesoporous silica particles.

After particles were collected by centrifuging the above processed solution after aging, dispersing particles in ion exchange water and re-centrifugation were repeated to remove sulfuric acid and sodium sulfate from the processed solution.

Then, the mesoporous silica particles were dispersed in ethanol to a concentration of 1 wt %, stirred under heating and centrifuged to collect particles. Stirring in ethanol and the collection of particles by centrifugation were repeated to remove the surfactant, and the particles were dried to obtain mesoporous silica particles of the present invention.

Since three diffraction peaks corresponding to d values of 9.4, 5.9 and 5.2 were seen by the X-ray diffraction measurement of the obtained mesoporous silica particles, it was confirmed that the mesoporous silica particles had a regular mesoporous structure. Since only a broad halo was seen and no peak derived from crystalline silica was seen on a large angle side, it was confirmed that the mesoporous silica particles were amorphous.

As a sharp peak was seen at a mesopore diameter of about 8 nm in the mesopore distribution curve of the mesoporous silica particles, it was verified that the mesoporous silica particles had uniform mesopores.

The physical properties of the obtained mesoporous silica particles are shown in Table 1.

Example 4

A block copolymer of ethylene glycol and propylene glycol (Pluronic-P123 of BASF Co., Ltd.) was dissolved in ion exchange water to prepare a 20 wt % surfactant solution. 100 g of the surfactant solution, 44 g of 25 wt % sulfuric acid and 123 g of ion exchange water were mixed together to prepare a transparent solution. 133 g of sodium silicate (containing 15 wt % of $SiO_2$ and 5.1 wt % of $Na_2O$) was added dropwise to this solution under stirring to obtain a cloudy reaction mixture. The pH of the reaction mixture was 2.7.

The reaction mixture was maintained at 30° C. for 10 hours under stirring, heated at 80° C. and maintained at that temperature for 12 hours to produce mesoporous silica particles having the surfactant existent in mesopores.

After particles were collected by centrifuging the above mixture solution, dispersing particles in ion exchange water and re-centrifugation were repeated to remove sulfuric acid and sodium sulfate from the reaction mixture.

Ion exchange water was added to the above precipitate obtained by centrifugation and stirred to obtain a dispersion containing 5 wt % of mesoporous silica particles.

A polyethylene pot was filled with 390 g of the above dispersion and 1,520 g of zirconia balls having a diameter of 2 mm and sealed up without a dead volume in the pot to wet pulverize the dispersion with a pot mill. The amount of the surfactant existent in the mesopores was 85 parts by weight based on 100 parts by weight of silica, and the pH of the processed solution was 5.8.

A precipitate was collected from the processed solution after wet pulverizing by centrifugation.

Then, the mesoporous silica particles were dispersed in ethanol to a concentration of 1 wt %, stirred under heating and centrifuged to collect particles. Stirring in ethanol and the collection of particles by centrifugation were repeated to remove the surfactant, and the particles were dried to obtain mesoporous silica particles.

Since three diffraction peaks corresponding to d values of 9.2, 5.8 and 5.2 were seen by the X-ray diffraction measurement of the obtained mesoporous silica particles, it was confirmed that the mesoporous silica particles had a regular mesoporous structure. Since only a broad halo was seen and no peak derived from crystalline silica was seen on a large angle side, it was confirmed that the mesoporous silica particles were amorphous.

As a sharp peak was seen at a mesopore diameter of about 8 nm in the mesopore distribution curve of the mesoporous silica particles, it was verified that the mesoporous silica particles had uniform mesopores but the area of the peak slightly decreased.

The physical properties of the obtained mesoporous silica particles are shown in Table 1.

Example 5

An active silica solution was obtained by treating sodium silicate (containing 4.0 wt % of $SiO_2$ and 1.4 wt % of $Na_2O$) with a strong acid cationic exchange resin. This active silica solution was added dropwise to an aqueous solution containing 150 parts by weight of hexadecyltrimethylammonium hydroxide and 200 parts by weight of 1,3,5-trimethylbenzene based on 100 parts by weight of silica under stirring with a propeller mixer. Then, sodium hydroxide was added to adjust the pH of the reaction solution to 8.5. Stirring was continued to carry out a reaction at 80° C. for 3 hours to obtain a cloudy reaction mixture. The pH of the reaction mixture was 8.4.

Part of the solution was removed from the above reaction mixture by decantation to adjust the content of the mesoporous silica particles in the reaction mixture to 5 wt %.

Thereafter, a polyethylene pot was filled with 390 g of the above reaction mixture containing 5 wt % of mesoporous silica particles and 1,520 g of zirconia balls having a diameter of 2 mm and sealed up without a dead volume in the pot to wet pulverize the mixture with a pot mill. The amount of the surfactant existent in the mesopores was 150 parts by weight based on 100 parts by weight of silica, the pH of the processed solution was 8.4, and the content of the mesoporous silica particles in the processed solution was 5 wt %.

After particles were collected by centrifuging the processed solution, dispersing particles in ion exchange water and re-centrifugation were repeated to remove sodium hydroxide from the processed solution.

Then, the mesoporous silica particles were dispersed in ethanol to a concentration of 1 wt %, stirred under heating and centrifuged to collect particles. Stirring in ethanol and the collection of particles by centrifugation were repeated to remove the surfactant so as to obtain mesoporous silica particles.

Since a diffraction peak corresponding to a d value of 7.7 was seen by the X-ray diffraction measurement of the obtained mesoporous silica particles, it was confirmed that the mesoporous silica particles had a regular mesoporous structure. Since only a broad halo was seen and no peak derived from crystalline silica was seen on a large angle side, it was confirmed that the mesoporous silica particles were amorphous.

As a sharp peak was seen at a mesopore diameter of about 7 nm in the mesopore distribution curve of the mesoporous silica particles, it was verified that the mesoporous silica particles had uniform mesopores.

The physical properties of the mesoporous silica particles are shown in Table 1.

Comparative Example 5

An active silica solution was obtained by treating sodium silicate (containing 4.0 wt % of $SiO_2$ and 1.4 wt % of $Na_2O$)

with a strong acid cationic exchange resin. This active silica solution was added little by little to an aqueous solution containing 150 parts by weight of hexadecyltrimethylammonium hydroxide and 200 parts by weight of 1,3,5-trimethylbenzene based on 100 parts by weight of silica under stirring with a propeller mixer. Then, sodium hydroxide was added to adjust the pH of the reaction solution to 8.5. Stirring was continued to carry out a reaction at 80° C. for 3 hours to obtain a precipitate which was then filtered and rinsed to obtain mesoporous silica particles having the surfactant existent in mesopores.

Thereafter, the mesoporous silica particles were dispersed in ethanol to a concentration of 1 wt %, stirred under heating and centrifuged to collect a precipitate. Stirring in ethanol and the collection of a precipitate by centrifugation were repeated to remove the surfactant.

20 parts by weight of the mesoporous silica particles from which the above surfactant had been removed, 1 part by weight of diallyl dimethylammonium chloride polymer and 79 parts by weight of ion exchange water were mixed together and pre-dispersed with a homogenizer (Ultra-Turrax T-50 of Ika Co., Ltd.) to obtain a mesoporous silica particle dispersion having a silica content of 20 wt %.

The above dispersion was let pass through an orifice repeatedly by a high-pressure homogenizer (Nanomizer LA-31 of Nanomizer Co., Ltd.) at processing pressure of 80 MPa to obtain mesoporous silica particles as Comparative Example 5.

Since a diffraction peak corresponding to a d value of 7.7 was seen by the X-ray diffraction measurement of the obtained mesoporous silica particles, it was confirmed that the mesoporous silica particles had a regular mesoporous structure. However, as the diffraction peak was broader than that of Example 5, the mesoporous silica particles of Comparative Example 5 were inferior to the mesoporous silica particles of Example 5 in structural regularity.

As a peak was seen at a mesopore diameter of about 7 nm in the mesopore distribution curve of the mesoporous silica particles and broader than that of Example 5, it was verified that the mesoporous silica particles of Comparative Example 5 were inferior to the mesoporous silica particles of Example 5 in the uniformity of mesopores.

The physical properties of the obtained mesoporous silica particles are shown in Table 1.

Example 6

Ion exchange water was added to the mesoporous silica particles obtained in Example 1 to a concentration of 15 wt % and agitated violently to obtain the mesoporous silica particle dispersion of the present invention.

60 g of the mesoporous silica particle dispersion and 45 g of a 10 wt % polyvinyl alcohol solution were mixed together to prepare a coating solution for forming a thin film. This coating solution was applied to a hydrophilized PET film and dried to form a thin film.

The thin film had a glossy surface. When its section was observed through an optical microscope, it was confirmed that it was a flat homogenous film.

Comparative Example 6

A thin film was obtained in the same manner as in Example 6 except that the mesoporous silica particles obtained in Comparative Example 1 were used.

The thin film had a rough surface. When its section was observed through an optical microscope, it was found that the surface was very rough and coarse particles were contained in the film.

Example 7

A dispersion containing 10 wt % of mesoporous silica particles was prepared by adding ion exchange water to the mesoporous silica particles obtained in Example 1. The dispersion was introduced into a spray dryer and granulated by spraying to obtain the mesoporous silica particle granulated product of the present invention.

When the obtained mesoporous silica particle granulated product was observed through a scanning electron microscope, the granulated product was composed of agglomerates of fine particles each of which was as large as about 120 µm. A large number of macropores having a diameter of about 100 to 300 nm derived from the gap between fine particles were existent in the granulated product.

When the mesopore volume, average mesopore diameter, $\sigma_p$ and X-ray diffraction of the mesoporous silica particle granulated product were measured, the same results as those of Example 1 were obtained and it was confirmed that the product was a granulated product having macropores for facilitating the dispersion in particles of a substance while retaining the characteristic properties of mesoporous silica particles.

Comparative Example 7

Spray granulation was carried out in the same manner as in Example 7 except that the mesoporous silica particles

TABLE 1

|  | physical properties of mesopores | | | | | particle diameter | |
| --- | --- | --- | --- | --- | --- | --- | --- |
|  | specific surface area ($m^2/g$) | Mesopore volume (mL/g) | average mesopore diameter (nm) | geometric standard deviation | mesopore retainability (%) | mesoporous structure | average particle diameter (µm) | geometric standard deviation |
| Example 1 | 830 | 1.11 | 7.0 | 1.6 | 94 | Honeycomb-like | 0.22 | 1.9 |
| C. Ex. 1 | 850 | 1.18 | 7.0 | 1.6 | 100 | Honeycomb-like | 16 | 2.0 |
| C. Ex. 2 | 390 | 0.59 | 17 | 1.8 | 50 | Irregular | 0.27 | 2.0 |
| Example 2 | 680 | 0.86 | 6.7 | 1.5 | 100 | 3-D net-like | 0.33 | 1.8 |
| C. Ex. 3 | 680 | 0.86 | 6.7 | 1.5 | 100 | 3-D net-like | 41 | 2.4 |
| C. Ex. 4 | 390 | 0.52 | 15 | 1.9 | 61 | Irregular | 0.39 | 1.9 |
| Example 3 | 850 | 1.17 | 7.1 | 1.6 | 99 | Honeycomb-like | 0.22 | 1.8 |
| Example 4 | 750 | 0.94 | 7.5 | 1.7 | 80 | Honeycomb-like | 0.21 | 1.9 |
| Example 5 | 860 | 1.08 | 5.8 | 1.5 | 95 | Honeycomb-like | 0.32 | 1.8 |
| C. Ex. 5 | 820 | 1.05 | 5.9 | 2.1 | 95 | Honeycomb-like | 0.42 | 1.3 |

C. Ex.: Comparative Example obtained in Comparative Example 1 were used. The obtained granulated product was fragile and got powdered immediately.

When the powdered granulated product was observed through a scanning electron microscope, it was composed of particles as large as about 10 to 100 μm each of which was just a mass, and the existence of macropores was not observed.

As described above, according to the production process of the present invention, even when an aqueous dispersion medium is used, mesoporous silica particles can be pulverized into submicron-sized fine particles while the collapse of mesopores is suppressed.

According to the present invention, there are provided novel mesoporous silica particles having a particle diameter of 1 μm or less which could not be achieved in the prior art, a satisfactory mesopore volume and uniformity in mesopore diameter. When the mesoporous silica particles are used as an ink absorbent for ink jet recording paper, they greatly improve the gloss and printing density of the ink jet recording paper, compared with those of the prior art. The mesoporous silica particles of the present invention are useful as a low-dielectric film, catalyst support, separating agent, adsorbent and medical carrier for medicines in addition to the above applications.

What is claimed is:

1. A process for producing fine mesoporous silica particles, comprising the step of wet pulverizing mesoporous silica particles having a surfactant in their mesopores while the surfactant is present in the mesopores of the mesoporous silica particles,
    wherein the surfactant is selected from the group consisting of alkyltrimethylammonium, polyoxyethylene alkyl ethers having a linear alkyl group having 8 to 20 carbon atoms, and block copolymers of ethylene glycol and propylene glycol.

2. The process according to claim 1, wherein the amount of the surfactant is 20 to 300 parts by weight based on 100 parts by weight of the mesoporous silica particles.

3. The process according to claim 1, wherein the pH of a solution processed by wet pulverizing is within a range of at which mesoporous silica particles are formed from silica source ±2.

4. The process according to claim 2, wherein the pH of a solution processed by wet pulverizing is within a range of pH at which mesoporous silica particles are formed from silica source ±2.

5. The process according to claim 1, wherein the mesoporous silica particles have an average particle diameter of 1 μm or less after wet pulverizing.

6. The process according to claim 2, wherein the mesoporous silica particles have an average particle diameter of 1 μm or less after wet pulverizing.

7. The process according to claim 3, wherein the mesoporous silica particles have an average particle diameter of 1 μm or less after wet pulverizing.

8. A process for producing fine mesoporous silica particles, comprising the steps of:
    a reaction step of forming mesoporous silica particles in a polar solvent by precipitating silica in the presence of a surfactant, wherein the surfactant is selected from the group consisting of alkyltrimethylammonium, polyoxyethylene alkyl ethers having a linear alkyl group having 8 to 20 carbon atoms, and block copolymers of ethylene glycol and propylene glycol;
    a pulverizing step of wet pulverizing the mesoporous silica particles having a surfactant in their mesopores contained in a reaction mixture obtained in the above reaction step as a solution to be processed; and
    a removing step of removing at least part of the surfactant existent in the mesopores of the mesoporous silica particles.

9. The process according to claim 1, wherein fine mesoporous silica particles having an average mesopore diameter of 5 nm or more are formed by the wet pulverizing step.

10. The process according to claim 1, wherein the fine mesoporous silica particles have a geometric standard deviation of a particle size distribution of 1 to 3.

* * * * *